(12) United States Patent
Wahner et al.

(10) Patent No.: US 6,745,565 B1
(45) Date of Patent: Jun. 8, 2004

(54) VENT CAP FOR HYDRAULIC APPARATUS

(75) Inventors: Adam William Wahner, Sullivan, IL (US); Scott W. Keller, Charleston, IL (US); Lonnie E. Holder, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 92 days.

(21) Appl. No.: 10/279,332

(22) Filed: Oct. 24, 2002

(51) Int. Cl.$^7$ .......................... F16D 39/00; B65D 51/16
(52) U.S. Cl. ...................... 60/487; 220/367.1
(58) Field of Search ............... 60/487, 585; 220/367.1, 220/792; 215/354

(56) References Cited

U.S. PATENT DOCUMENTS

| | | |
|---|---|---|
| 71,964 A | 12/1867 | Boyd |
| 530,418 A | 12/1894 | Ingalls |
| 888,728 A | 5/1908 | McLean |
| 891,957 A | 6/1908 | Schubert |
| 1,271,166 A | 7/1918 | Hutton |
| 1,420,141 A | 6/1922 | Pennington |
| 1,505,794 A | 4/1924 | McCarty |
| 1,496,797 A | 6/1924 | Waska |
| 3,022,717 A | 2/1962 | Webster |
| 4,144,802 A | 3/1979 | Babin |
| 4,147,096 A | 4/1979 | Caswell |
| 4,454,031 A * | 6/1984 | Schier .................. 220/374 |
| 4,572,059 A | 2/1986 | Ramsay |
| 5,088,947 A | 2/1992 | Whitley, II et al. |
| 5,314,387 A | 5/1994 | Hauser et al. |
| 5,749,780 A | 5/1998 | Harder et al. |
| 6,015,444 A | 1/2000 | Craft et al. |
| 6,185,936 B1 | 2/2001 | Hauser et al. |
| 6,199,380 B1 | 3/2001 | Ishii |
| 6,216,560 B1 | 4/2001 | Takada et al. |
| 6,233,929 B1 | 5/2001 | Okada et al. |
| 6,364,924 B1 | 4/2002 | Mashiko et al. |
| 6,374,425 B2 | 4/2002 | Downey |
| 6,447,565 B1 | 9/2002 | Raszkowski et al. |
| 6,622,825 B2 * | 9/2003 | Iida et al. .................. 184/6.25 |

* cited by examiner

Primary Examiner—Thomas E. Lazo
(74) Attorney, Agent, or Firm—Neal, Gerber & Eisenberg, LLP (57) ABSTRACT

A vent apparatus for a hydrostatic device such as a hydrostatic transmission, including a vent tube in communication with a reservoir and a vent cap secured to the tube in a manner to permit the cap to pivot or swivel with respect to the vent tube, in order to prevent water from entering the reservoir through the vent tube.

29 Claims, 7 Drawing Sheets

VENT CAP FOR HYDRAULIC APPARATUS

BACKGROUND OF THE INVENTION

This invention relates to a vent cap used in connection with a hydraulic apparatus such as a hydrostatic transmission (HST) or an integrated hydrostatic transaxle (IHT), where the HST is in a common housing with output gearing, a differential, output axles and the like. The general design of an IHT is known, and is disclosed in U.S. Pat. Nos. 5,314,387 and 6,185,936, the terms of which are incorporated herein in their entirety. Such IHTs are generally used with lawn and garden tractors and similar low speed vehicles. The invention could also be used with a wide variety of other hydrostatic applications, including industrial applications. It is described in connection with an HST or IHT used in a vehicle simply for convenience and simplicity, and such description should not be read as a limitation on the scope of the invention.

SUMMARY OF THE INVENTION

An HST or IHT generally has an oil sump in which various components, such as the hydraulic pump, motors and/or gears, are located. During operation, the operating oil will heat and expand, and so a reservoir is provided into which the expanded oil may flow. When the oil cools, it will again flow from the reservoir to the main sump. Such a reservoir may be internal to the main sump either as a separate formed structure therein or it may be an external structure connected to the main sump through a hose or the like. It may also take the form of simply an open space at the top of the sump.

In any case, the reservoir must be open to the atmosphere to permit air flow in and out and thus a vent is used to permit such air transfer. A major problem with prior art designs is that the vent opening also permits water to seep into the reservoir and thus into the oil supply. As is known, water can cause significant problems in the operation of hydraulic equipment, including degraded operation, cavitation and eventually damage and failure. Known designs have an opening to the reservoir vent with some type of cap structure mounted thereon to keep water out; however, such designs still permit water to seep into the reservoir through capillary action or otherwise.

Such hydrostatic drive apparatus are frequently used in situations where exposure to water cannot be prevented. For example, an IHT used in a lawn and garden tractor will frequently be subject to water spray, either accidental or intentional. These units are often cleaned with a hose, so that a spray may be inadvertently directed onto the vent for the oil reservoir.

The present invention solves these problems through an improved vent cap design, as will be disclosed herein with respect to the figures described below. A better understanding of the objects, advantages, features, properties and relationships of the invention will be obtained from the following detailed description and accompanying drawings which set forth an illustrative embodiment and is indicative of the various ways in which the principles of the invention may be employed.

DETAILED DESCRIPTION OF THE DRAWINGS

Figure 1:
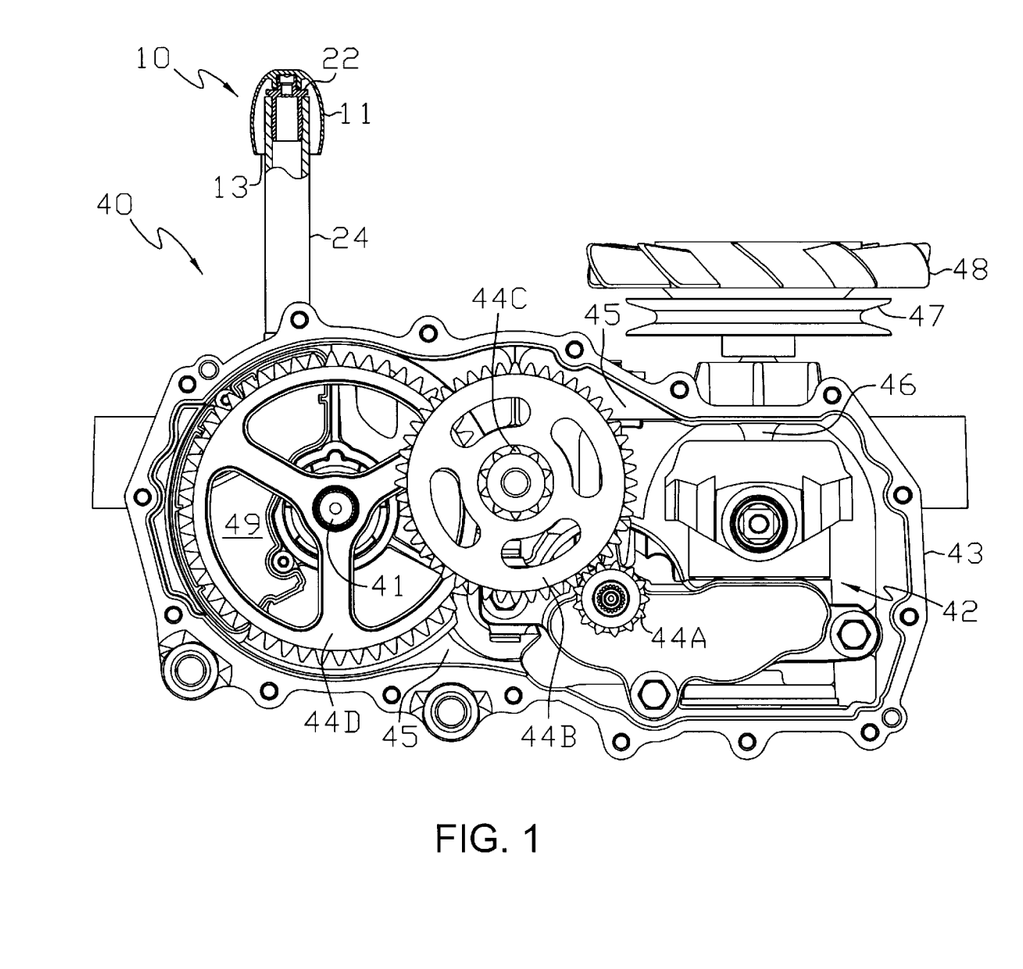
FIG. 1 is a side view of an integrated hydrostatic transaxle using one embodiment of the present invention. The transaxle has one portion of its external casing removed for clarity.

FIG. 1 shows a possible application for the present invention, namely a hydrostatic transaxle 40 having a hydrostatic transmission 42 and various output gears 44A, 44B, 44C and 44D driving an output axle 41, all of which are mounted inside housing 43. An input shaft 46 is driven by a pulley 47 and a fan 48 is also mounted thereon for cooling purposes. The housing 43 of IHT 40 consists of two pieces split along a vertical split line (i.e., parallel to the longitudinal axis of input shaft 46); one half of housing 43 is shown for clarity. The specific structure of transaxle 40 is not critical to the present invention, and the reader is directed to U.S. Pat. Nos. 5,314,387 and 6,185,396 for an explanation of possible IHT designs.

A sump 45 is formed inside housing 43 to hold the operating oil for HST 42; this same oil is used to lubricate gears 44A–D. In this embodiment depicted, an internal expansion tank is formed within a cavity formed by housing 43 and sealed by cover 49. A siphon mechanism (not shown) may be used to transfer oil from inside the internal expansion tank to the sump 45. As noted previously, the expansion tank could be mounted externally to housing 43, or sump 45 could perform the same function if the unit is not fully filled with oil for operation.

Figure 2:
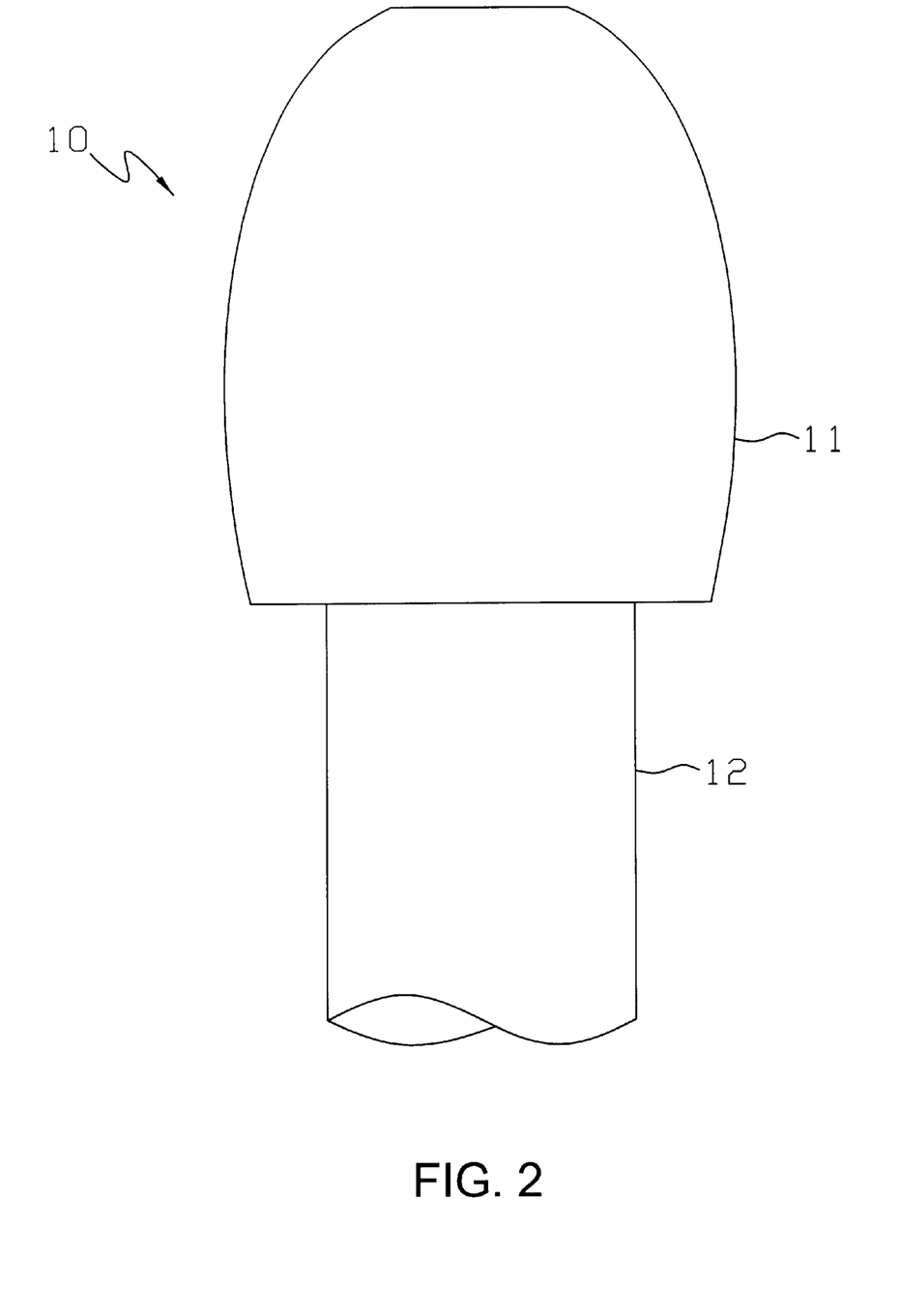
FIG. 2 is a side elevational view of a vent cap in accordance with one embodiment of this invention.
Figure 3A:
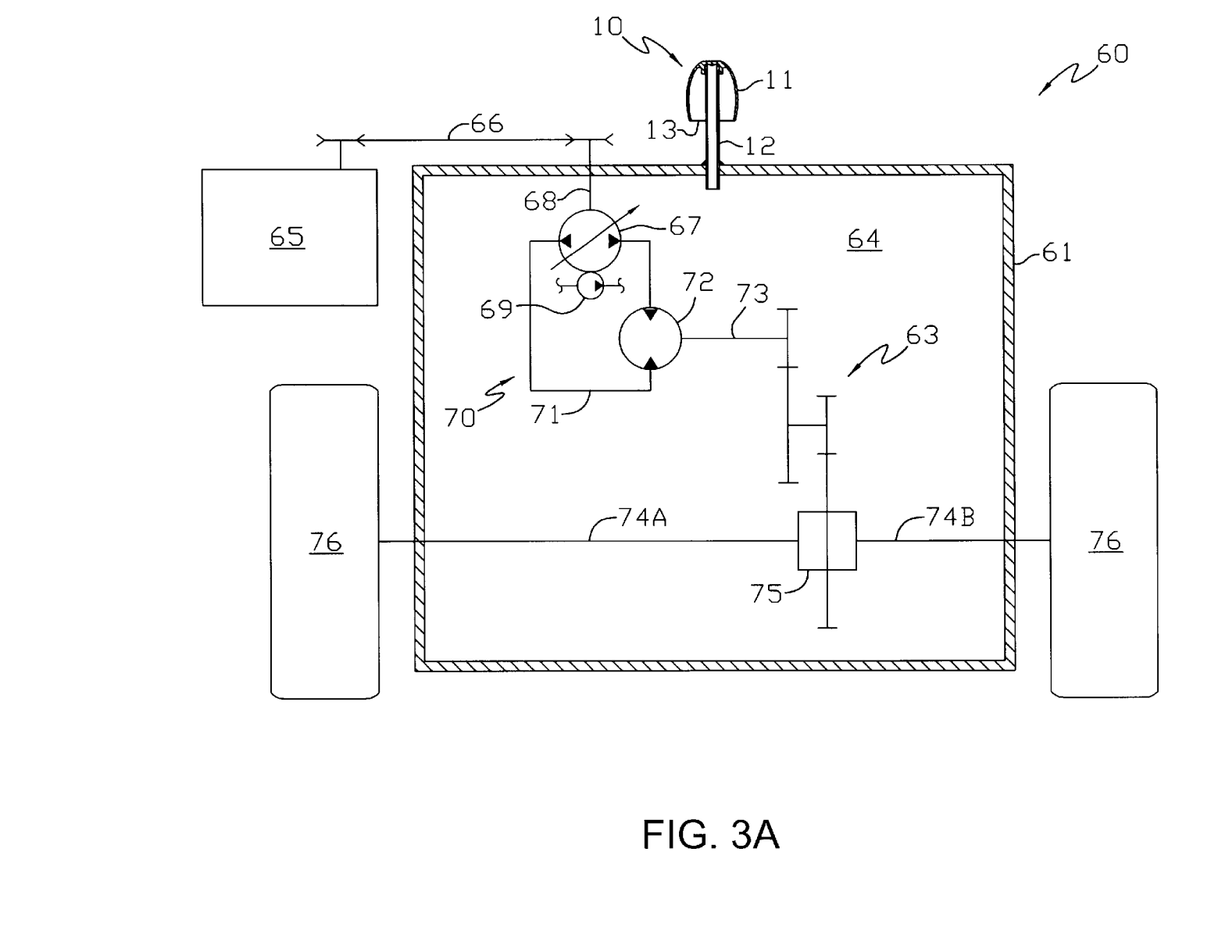
FIG. 3A is a schematic view of a hydrostatic transaxle incorporating a vent cap and reservoir in accordance with one embodiment of this invention.
Figure 3B:
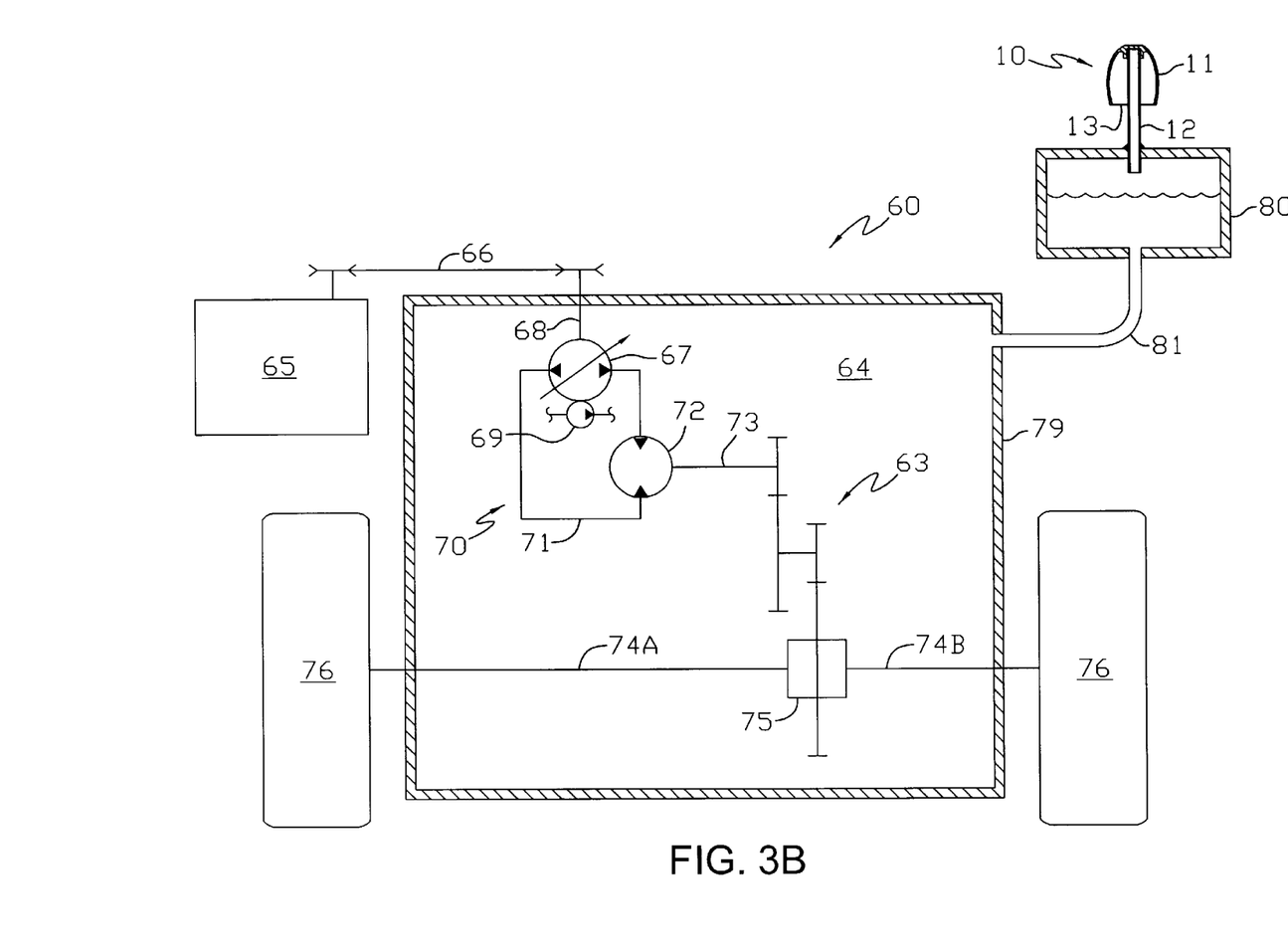
FIG. 3B is a schematic view of an alternative embodiment of a hydrostatic transaxle incorporating a vent cap in accordance with one embodiment of this invention.

FIGS. 2, 3A and 3B depict a simplified version of a vent apparatus 10, having vent cap 11 mounted to a vent 12 which is mounted to and extends into reservoir 14. Vent cap 11 is generally bowl shaped, with an opening 13 formed at the bottom thereof. The sides of vent cap 11 extend down from the top 15 thereof to shield the vent opening.

In FIGS. 3A and 3B, transaxle 60 is shown in schematic because the specific operation thereof is not critical to this invention, and this invention can be used with any number of transaxle designs. It will be understood by one of skill in the art that FIGS. 3A and 3B, since they are schematic representations, do not accurately reflect the layout of a preferred design; one would understand, for example, that vent 12 would extend in a vertical direction with regard to the direction of the vehicle in which the hydrostatic transaxle is mounted.

FIG. 3A specifically shows transaxle 60 having a housing 61 defining an internal oil sump 64 which contains operating oil for both the hydrostatic transmission 70 as well as the gear train 63. FIG. 3B is essentially identical to FIG. 3A except that housing 79 and its internal sump 64 are connected to an external reservoir 80 through a hose 81 or similar connection.

As is known in the art, a prime mover such as engine 65 is connected through a pulley and belt combination 66 to drive pump input shaft 68. Direct shaft drive and other methods of connection are also known and can be used in place of pulley and belt combination 66. Pump 67, which has an optional charge pump 69 connected thereto, is driven by input shaft 68 and is connected to hydraulic motor 72 through porting 71. Hydraulic motor output shaft 73 drives gear train 63 which in turn powers differential 75 to drive axles 74A and 74B to power drive wheels 76. As stated, it is not required that HST 70 and gear train 63 be in the same oil sump 64, as these elements could be segregated if other design factors require it.

In FIG. 3A, vent apparatus 10 is mounted directly to housing 61 and vent 12 is in communication with sump 64. In FIG. 3B, on the other hand, vent apparatus 10 is mounted to external reservoir 80 instead.

Figure 4:
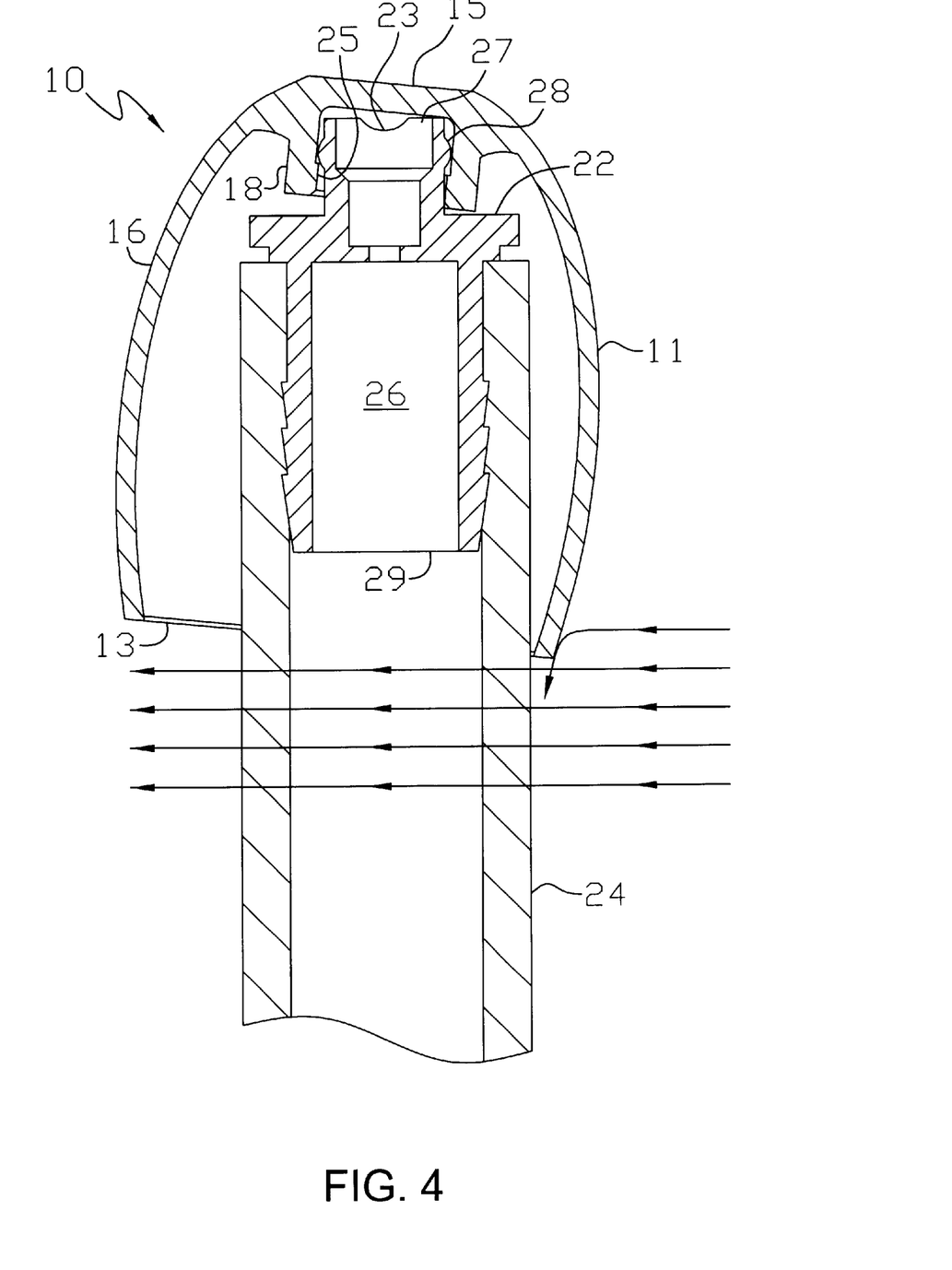
FIG. 4 is a cross sectional side view of the vent cap shown in FIG. 2.

Operation of the present invention can be seen most clearly in FIG. 4, where the arrows depict the direction of possible water spray against the apparatus. In this embodiment, vent tube 24 is used to extend down into the reservoir (not shown). Fitting 22 is mounted in a first end of vent tube 24; a passage 26 is formed in fitting 22 and has a first opening 27 at the top thereof and a second opening 29 at the bottom and open to the vent tube 24. It will be understood that the specific arrangement and appearance of passage 26 is not critical to this invention.

Vent cap 11 has a top 15 and a continuous side 16 extending generally downwards from top 15 to opening 13. It also has an internal generally circular ring 18 extending downwardly from top 15 and having an inner circumference sized to fit over the top of fitting 22.

A benefit of this design is the ability of vent cap 11 to pivot about the longitudinal axis of vent 24 and fitting 22. As shown in FIG. 4, when water spray contacts the sides 16 of vent cap 11, the entire vent cap 11 pivots or swivels about the top thereof, so that the bottom of side 16 contacts vent tube 24 to aid in deflecting water away from vent opening 27 and thus minimize the amount of water going up towards vent opening 27.

In the embodiment shown in, e.g., FIG. 4, the swiveling or pivoting action is provided by the interaction between fitting 22 and the inner circumference of inner ring 18. Specifically, fitting 22 has an annular structure 28 formed thereon which protrudes from fitting 22 to contact the inner circumference of ring 18. Ring 18 also has an annular structure 25 which extends inwardly about the inner circumference thereof; the interaction of structures 25 and 28 permit the vent cap 10 to be snapped onto fitting 22 and permits the swiveling action described above. It is preferred that the height of vent cap 11 (i.e., the distance from top 15 to opening 13) be at least twice the distance from the top of fitting 22 to the top of vent tube 24.

Notch 23 on the top of fitting 22 permits air to flow through opening 27; it is important that the interaction between fitting 22 and cap 11 be such that it does not create an air-tight seal, as this would defeat the purpose of the vent. Other designs to create such spacing for airflow could also be used.

Figure 5A:
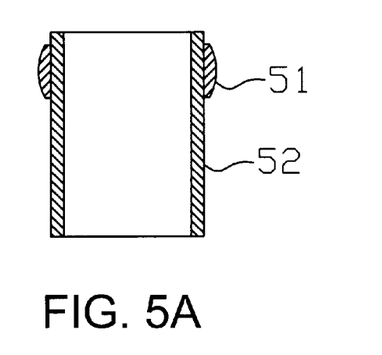
FIGS. 5A, 5B and 5C depict alternative embodiments of the engagement structure of the vent on which the vent cap may be secured.
Figure 5B:
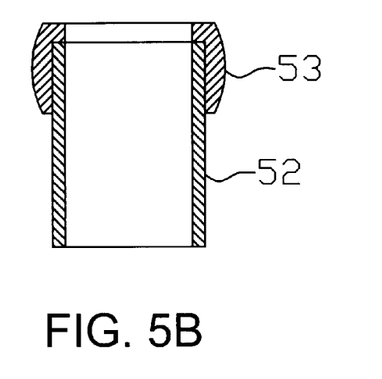
Figure 5C:
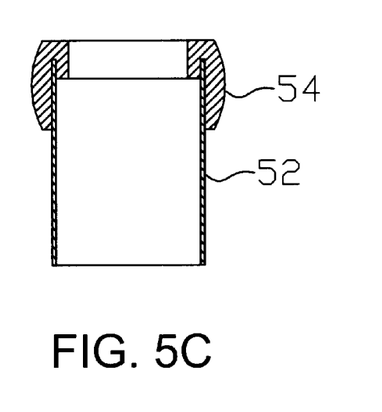

FIGS. 5A, 5B and 5C show alternative embodiments of the engagement structure formed on the vent to permit the swiveling or pivoting motion of the vent cap. Specifically, FIG. 5A shows an annulus 51 that may be glued or pressed on to tube 52. FIG. 5B shows a different annulus 53 which could be press fit or glued on to tube 52. FIG. 5C also shows a possible press fit annulus 54. The benefit of these designs is that they can be provided as a retrofit kit for use with existing vents or with materials such as extruded pipes where forming such features are difficult or impossible. Therefore, the user is provided with an easy manner to obtain the benefits of the vent cap of the present invention without the need to replace expensive components. In the preferred embodiment, the annulus in FIGS. 5A–C would be composed of a nitryl or plastic gasket; for a retrofit kit the material chosen would depend to a large extent on the material used for the existing vent to which it is applied. It will also be understood that while these structures 51, 53 and 54 have been described and shown as an annulus, they need not extend around the entire outer circumference of the tube 52 in order to achieve the swiveling feature of this invention. These structures could also be used with a design such as fitting 22 described above instead of the tube 52.

Figure 6A:
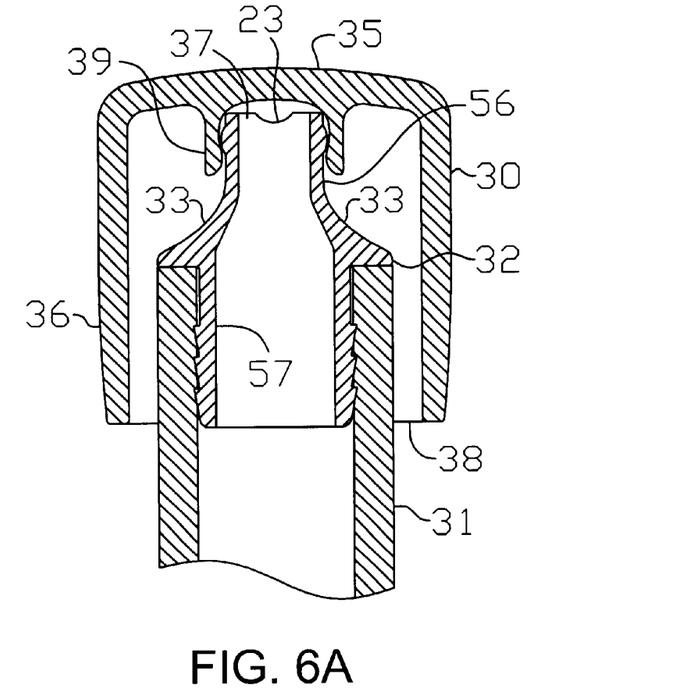
FIG. 6A is a cross-sectional side view of an alternative embodiment of the vent cap in accordance with the present invention.
Figure 6B:
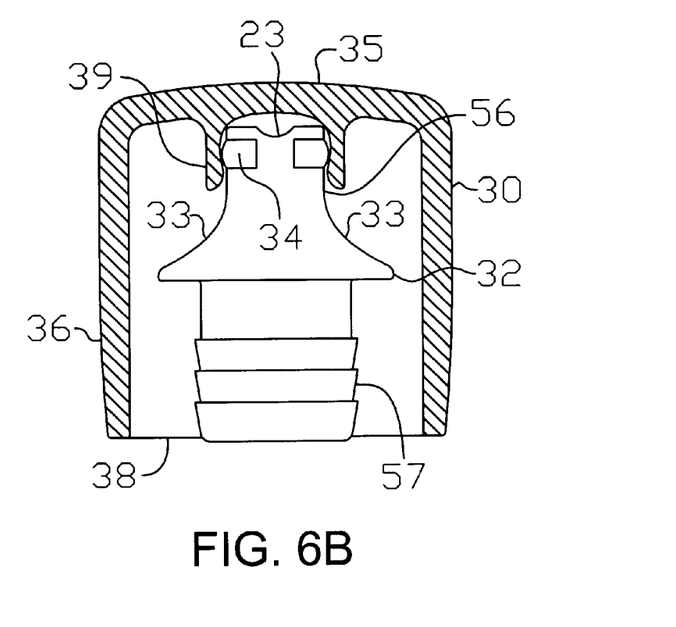
FIG. 6B is a partial cross-sectional view of certain components of the embodiment shown in FIG. 6A.

FIGS. 6A and 6B show an alternative embodiment of the present invention. FIG. 6B eliminates the tube 31 for clarity and does not show fitting 32 in cross-section so that the external structure thereof can be more clearly seen. In this embodiment, fitting 32 is mounted in tube 31 and comprises a body 57 mounted in tube 31 and a neck portion 56 integrally formed therewith. Neck portion 56 has curved shoulder portions 33 to prevent water from accumulating thereon, and an opening 37 formed at its top. Thus, if water does enter the inside of cap 30 through cap opening 38, it will not accumulate near the top of fitting 32, thus preventing capillary action from introducing water through vent opening 37.

Vent cap 30 has a generally flat top portion 35 and a continuous side 36 extending downward therefrom to the opening 38 formed at the bottom thereof. The shape of cap 30, where sides 36 extend generally perpendicular to top 35, is preferable due to ease of manufacturing this shape. An inner ring structure 39 is formed on the inner surface of top 35 as an engagement structure for fitting 32. The top of fitting 32 and ring structure 39 are shaped to permit movement of the bottom portion of cap 30, (i.e., adjacent to opening 38) to move relative to tube 31. In this embodiment, an engagement structure 34 is mounted on the neck portion 56; it does not need to extend around the entire circumference thereof; gaps in the structure 34 could enhance airflow in and out of vent opening 37. Structure 34 could be integrally formed with neck 56 or it could be otherwise secured, such as is shown in FIGS. 5A–C. As can be seen from FIGS. 6A and 6B, ring 39 does not need a separate protrusion formed thereon to create the necessary interaction between vent neck portion 56 and engagement structure 34 and ring 39. Rather, the wall of ring 39 simply has an increased diameter at the bottom thereof to permit neck portion 56 and engagement structure 34 to be snapped into ring 39, thus permitting cap 30 to swivel or rock with respect to tube 31 and fitting 32. The same design shown in FIGS. 6A and 6B could also be used with the embodiment shown in, e.g., FIGS. 3A and 3B, where the cap 11 is mounted directly on the tube 12, without need for a separate internal fitting.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A vent apparatus for a hydrostatic device having a reservoir for hydraulic fluid, comprising:
   a tube having a first end located outside the hydraulic fluid reservoir and a second end in communication with the hydraulic fluid reservoir;
   a vent cap having a top closed surface and a continuous side surface extending from the top surface to an opening at the bottom thereof;
   means for securing the vent cap to the first end of the tube to permit air to flow in and out of the first end of the tube and to permit the vent cap to pivot about the longitudinal axis of the tube, whereby the bottom of the vent cap can deflect toward the tube.

2. A vent apparatus as set forth in claim 1, further comprising a fitting mounted in the first end of the tube, and the means for securing comprises a first engagement structure located on the fitting and a second engagement structure mounted on the inner surface of the vent cap.

3. A vent apparatus as set forth in claim 2, wherein the first engagement structure comprises a first protrusion extending about a portion of the outer circumference of the tube.

4. A vent apparatus as set forth in claim 3, wherein the first protrusion extends around the entire circumference of the tube.

5. A vent apparatus as set forth in claim 3, wherein the first protrusion is glued to the fitting.

6. A vent apparatus as set forth in claim 3, wherein the first protrusion is press-fit on the tube.

7. A vent apparatus as set forth in claim 1, wherein the hydrostatic device comprises a hydraulic pump mounted in the reservoir.

8. A vent apparatus as set forth in claim 1, wherein the hydrostatic device comprises a main sump and the reservoir is formed as part of the main sump.

9. A vent apparatus as set forth in claim 8, wherein the hydrostatic device further comprises a hydrostatic transmission mounted in the main sump.

10. A vent apparatus as set forth in claim 9, wherein the hydrostatic device further comprises a gear train and differential mounted in the main sump and drivingly engaged to the hydrostatic transmission.

11. A vent apparatus as set forth in claim 1, wherein the hydrostatic device comprises a main sump, and the reservoir is separate from the main sump and connected thereto.

12. A vent apparatus as set forth in claim 11, wherein the hydrostatic device further comprises a hydrostatic transmission mounted in the main sump.

13. A vent apparatus for a hydrostatic device having a reservoir for hydraulic fluid, the vent apparatus comprising:
   a vent comprising a first end and a second end, where the second end is in communication with the hydraulic fluid reservoir;
   a first engagement structure located adjacent to the first end of the vent;
   a vent cap mounted on the first end of the vent, the vent cap comprising a generally cylindrical body being closed at a first end and open at a second end;
   a second engagement structure located on the inner surface of the closed first end of the vent cap and shaped to connect with the first engagement structure to permit the vent cap to pivot with respect to the first end of the vent, so that the second end of the vent cap may move towards the vent; and
   an opening associated with the first end of the vent to permit air to flow through the vent when the vent cap is affixed thereto.

14. A vent apparatus as set forth in claim 13, where the vent comprises:
   a generally cylindrical tube having a first end and a second end, where the second end is in communication with the hydraulic fluid reservoir;
   a fitting having a first end mounted in the first end of the tube and a second end extending out of the tube, wherein the first engagement structure is mounted on the fitting adjacent to the second end thereof.

15. A vent apparatus as set forth in claim 14, where the first engagement structure is integrally formed on the fitting.

16. A vent apparatus as set forth in claim 14, where the first engagement structure is press-fit on the fitting.

17. A vent apparatus as set forth in claim 14, where the first engagement structure is glued to the fitting.

18. A vent apparatus as set forth in claim 14, wherein the opening comprises at least one notch formed in the top of the fitting.

19. A vent apparatus as set forth in claim 15, wherein the first engagement structure is a protrusion formed about the outer circumference of the fitting adjacent to the first end thereof.

20. A vent apparatus as set forth in claim 13, wherein the second engagement structure comprises a ring structure formed on the inside of the closed first end of the vent cap.

21. A vent apparatus as set forth in claim 13, wherein the second end of the vent extends into he hydraulic fluid reservoir.

22. A vent apparatus as set forth in claim 14, wherein the fitting comprises a curved side member joining the first end to the second end thereof.

23. An axle driving apparatus comprising:
   a housing forming a main oil sump and having a reservoir space associated therewith;
   a hydrostatic drive apparatus mounted in the housing;
   a vent comprising a first end and a second end, where the second end is in communication with the reservoir;
   a first engagement structure located adjacent to the first end of the vent;
   a vent cap mounted on the first end of the vent, the vent cap comprising a generally cylindrical body being closed at a first end and open at a second end;
   a second engagement structure located on the inner surface of the closed first end of the vent cap and shaped to connect with the first engagement structure to permit the vent cap to pivot with respect to the first end of the vent, so that the second end of the vent cap may move towards the vent; and
   an opening associated with the first end of the vent to permit air to flow through the vent when the vent cap is affixed thereto.

24. An axle driving apparatus as set forth in claim 23, where the vent comprises:
   a generally cylindrical tube having a first end and a second end, where the second end is in communication with the hydraulic fluid reservoir;
   a fitting having a first end mounted in the first end of the tube and a second end extending out of the tube, wherein the first engagement structure is mounted on the fitting adjacent to the second end thereof.

25. An axle driving apparatus as set forth in claim 24, wherein the hydrostatic drive apparatus comprises a hydrostatic transmission having a hydraulic pump and a hydraulic motor.

26. An axle driving apparatus as set forth in claim 25, wherein the hydrostatic drive apparatus further comprises a gear train and differential mounted in the main sump and drivingly engaged to the hydrostatic transmission.

27. An axle driving apparatus as set forth in claim 26, wherein the reservoir is separate from the main sump and connected thereto.

28. An axle driving apparatus as set forth in claim 26, wherein the reservoir is formed as part of the main sump.

29. A kit for use with an axle driving apparatus having a housing forming a main oil sump and a reservoir space associated therewith, a hydrostatic drive apparatus mounted in the housing and a vent tube extending from the reservoir space, the kit comprising:

a first engagement structure which may be mounted on one end of the vent tube to create an enlarged radial portion thereof;

a vent cap to mount on the first end of the vent, the vent cap comprising a generally cylindrical body being closed at a first end and open at a second end, the vent cap having a second engagement structure located on the inner surface of the closed first end and shaped to connect with the first engagement structure to permit the vent cap to pivot with respect to the tube, so that the second end of the vent cap may move towards the tube.

* * * * *